(12) United States Patent
Taylor et al.

(10) Patent No.: US 8,479,489 B2
(45) Date of Patent: Jul. 9, 2013

(54) TURBINE EXHAUST RECIRCULATION

(75) Inventors: Robert Warren Taylor, Ponte Vedra Beach, FL (US); James Easel Roberts, Kansas City, MO (US)

(73) Assignee: General Electric Company, Schenectady, NY (US)

(*) Notice: Subject to any disclaimer, the term of this patent is extended or adjusted under 35 U.S.C. 154(b) by 818 days.

(21) Appl. No.: 12/548,526

(22) Filed: Aug. 27, 2009

(65) Prior Publication Data
US 2011/0048002 A1 Mar. 3, 2011

(51) Int. Cl.
*F02C 7/08* (2006.01)

(52) U.S. Cl.
USPC .................... 60/39.52; 60/605.2

(58) Field of Classification Search
USPC ............... 60/39, 82, 645, 655, 670, 39.52, 60/605.2
See application file for complete search history.

(56) References Cited

U.S. PATENT DOCUMENTS

| | | | | |
|---|---|---|---|---|
| 4,204,401 A | * | 5/1980 | Earnest | 60/773 |
| 4,271,664 A | * | 6/1981 | Earnest | 60/39.181 |
| 4,377,073 A | * | 3/1983 | Pocrnja et al. | 60/693 |
| 6,571,548 B1 | * | 6/2003 | Bronicki et al. | 60/772 |
| 6,637,183 B2 | * | 10/2003 | Viteri et al. | 60/39.182 |
| 7,493,768 B2 | * | 2/2009 | Klaus et al. | 60/772 |
| 7,574,856 B2 | * | 8/2009 | Mak | 60/39.182 |
| 7,861,511 B2 | * | 1/2011 | Chillar et al. | 60/39.52 |
| 7,971,424 B2 | * | 7/2011 | Masada | 60/39.182 |
| 8,056,318 B2 | * | 11/2011 | Chillar et al. | 60/39.52 |
| 8,236,093 B2 | * | 8/2012 | Taylor et al. | 60/39.181 |
| 8,356,466 B2 | * | 1/2013 | Motakef et al. | 60/39.182 |
| 2002/0023423 A1 | | 2/2002 | Viteri et al. | |
| 2002/0053196 A1 | * | 5/2002 | Lerner et al. | 60/39.182 |
| 2005/0262842 A1 | * | 12/2005 | Claassen et al. | 60/618 |
| 2007/0240420 A1 | * | 10/2007 | Bronicki | 60/671 |
| 2008/0011160 A1 | | 1/2008 | Bowman et al. | |
| 2008/0134660 A1 | * | 6/2008 | Finkenrath et al. | 60/39.52 |
| 2008/0309087 A1 | * | 12/2008 | Evulet et al. | 290/52 |
| 2009/0107141 A1 | | 4/2009 | Chillar et al. | |
| 2009/0120088 A1 | | 5/2009 | Chillar et al. | |

(Continued)

FOREIGN PATENT DOCUMENTS

| JP | 10082306 A | 3/1998 |
|---|---|---|
| WO | 2010084119 A1 | 7/2010 |

OTHER PUBLICATIONS

GB Search Report for GB Application No. GB1013138.1 issued Dec. 1, 2010.

*Primary Examiner* — Thai Ba Trieu
*Assistant Examiner* — Paolo Isada
(74) *Attorney, Agent, or Firm* — Cooper Legal Group, LLC (57) ABSTRACT

An exhaust gas recirculation (EGR) system and a method for recirculating an exhaust gas stream from an outlet to an inlet of a turbomachine are provided. The EGR system includes a guide element to channel the exhaust gas stream from the inlet to the outlet and a Rankine cycle system through which a working fluid is circulated. The Rankine cycle system including serially a high temperature heat exchanger in heat exchange relationship with the guide element; an expansion device coupled to a generator; a low temperature heat exchanger in heat exchange relationship with a cooling medium; and a pump. The exhaust stream at the outlet has a first temperature and the exhaust stream downstream of the high temperature heat exchanger has a second temperature that is lower than the first temperature.

12 Claims, 5 Drawing Sheets

U.S. PATENT DOCUMENTS

| | | |
|---|---|---|
| 2009/0120089 A1 | 5/2009 | Chillar et al. |
| 2009/0145126 A1 | 6/2009 | Chillar et al. |
| 2011/0011052 A1* | 1/2011 | Bronicki ............ 60/39.5 |
| 2011/0016863 A1* | 1/2011 | Ernst ............ 60/645 |
| 2011/0072818 A1* | 3/2011 | Cook ............ 60/645 |
| 2011/0259010 A1* | 10/2011 | Bronicki et al. ............ 60/651 |
| 2012/0031101 A1* | 2/2012 | Hoffmann et al. ............ 60/772 |
| 2012/0036860 A1* | 2/2012 | Wettstein et al. ............ 60/772 |

* cited by examiner

TURBINE EXHAUST RECIRCULATION

BACKGROUND OF THE INVENTION

1. Field of the Invention

The present invention relates to exhaust gas emitted from a turbomachine and, more particularly, to a system and a method for cooling the temperature of the exhaust stream prior to recirculation of the exhaust stream into the turbomachine.

2. Discussion of Prior Art

The operation of turbomachines, such as gas turbines, involves the emissions of nitrogen oxides (hereinafter "NOx"), carbon dioxide (hereinafter "$CO_2$") and sulfur oxides (hereinafter "SOx") and the allowable levels of these combustion by-products that can be emitted into the environment are heavily regulated. Exhaust gas recirculation (EGR) generally involves recirculating a portion of the exhaust gas stream through an inlet portion of the turbomachine where it is mixed with the incoming airflow prior to combustion. This process facilitates the removal and sequestration of concentrated CO2 and also reduces NOx emissions. The recirculated portion of the exhaust gas stream cannot simply be reintroduced to the inlet portion because the exhaust gas stream contains a variety of constituents, such as water, acids, aldehydes, hydrocarbons, sulfur oxides, and chlorine compounds, which, if allowed to enter the gas turbine untreated, will accelerate corrosion and fouling of the internal components.

Cooling the exhaust gas and performing scrubbing removes over 70% of the sulfur compounds present in the gas stream as well as significant quantities of the particulates. The cooling process may utilize tap water, water irrigated from a body of water or forced air in order to extract heat from the exhaust gas. However, such methods might not lower the temperature of the exhaust gas stream to the desired levels for recirculation. For example, there may be temperature requirements for the water and a plant site might not have access to such water. Moreover, in these methods, the heat in the exhaust gas stream is simply wasted and additional energy may be expended if a cooling process is implemented.

Thus, there is a need for a method that overcomes these difficulties in the cooling process and/or increases the overall electrical output of the overall system.

BRIEF DESCRIPTION OF THE INVENTION

The following presents a simplified summary of the invention in order to provide a basic understanding of some example aspects of the invention. This summary is not an extensive overview of the invention. Moreover, this summary is not intended to identify critical elements of the invention nor delineate the scope of the invention. The sole purpose of the summary is to present some concepts of the invention in simplified form as a prelude to the more detailed description that is presented later.

One aspect of the invention provides an exhaust gas recirculation (EGR) system for recirculating an exhaust gas stream from an outlet to an inlet of a turbomachine. The EGR system includes a guide element to channel the exhaust gas stream from the inlet to the outlet. The EGR system further includes a Rankine cycle system through which a working fluid is circulated. The Rankine cycle system serially includes a high temperature heat exchanger in heat exchange relationship with the guide element; an expansion device; a low temperature heat exchanger in heat exchange relationship with a cooling medium; and a pump. The exhaust stream at the outlet has a first temperature and the exhaust stream downstream of the high temperature heat exchanger has a second temperature that is lower than the first temperature.

Another aspect of the invention provides a method of cooling an exhaust gas stream from an outlet of a turbomachine prior to recirculation to an inlet of the turbomachine is provided. The method includes the steps of channeling the exhaust gas stream from the outlet of the turbomachine to the inlet of the turbomachine through a guide element; and cooling the exhaust gas stream by providing a Rankine cycle system through which a working fluid is circulated. The Rankine cycle system serially includes a high temperature heat exchanger in heat exchange relationship with the guide element; an expansion device; a low temperature heat exchanger in heat exchange relationship with a cooling medium; and a pump. The exhaust gas stream at the outlet has a first temperature and the exhaust stream downstream of the high temperature heat exchanger has a second temperature that is lower than the first temperature.

BRIEF DESCRIPTION OF THE DRAWING

The foregoing and other aspects of the present invention will become apparent to those skilled in the art to which the present invention relates upon reading the following description with reference to the accompanying drawings, in which.

DETAILED DESCRIPTION OF THE INVENTION

Example embodiments that incorporate one or more aspects of the present invention are described and illustrated in the drawings. These illustrated examples are not intended to be a limitation on the present invention. For example, one or more aspects of the present invention can be utilized in other embodiments and even other types of devices.

An embodiment of the present invention takes the form of a system that may recirculate at least a portion of the exhaust of a turbomachine so that it may be mixed with the inlet air and re-enter the turbomachine without affecting reliability and availability of the unit.

Generally, the exhaust gas recirculation system of an embodiment of the present invention comprises multiple elements. The configuration and sequence of the elements may be dictated by the composition of the exhaust gas. In general, the steps comprising the exhaust gas re-circulation process are cooling, scrubbing, de-misting, high efficiency particulate and droplet removal, and mixing.

The present invention reduces the temperature of the exhaust gas stream to a level that is suitable for re-entry into the inlet of a turbomachine. The present invention also increases the efficiency of electrical output which can in turn be used to achieve further cooling or operate other electrically operated components.

The present invention may be applied to a variety of turbomachines that produce a gaseous fluid, such as, but not limited to, a heavy duty gas turbine; an aero-derivative gas turbine; or the like (hereinafter "a gas turbine"). An embodiment of the present invention may be applied to either a single gas turbine or a plurality of gas turbines. An embodiment of the present invention may be applied to a gas turbine operating in a simple cycle or a combined cycle configuration.

The elements of the present invention may be fabricated of any materials that can withstand the operating environment under which the exhaust gas recirculation system may function and operate and, for example, may be heat-resistant, corrosion-resistant, etc.

Figure 1:
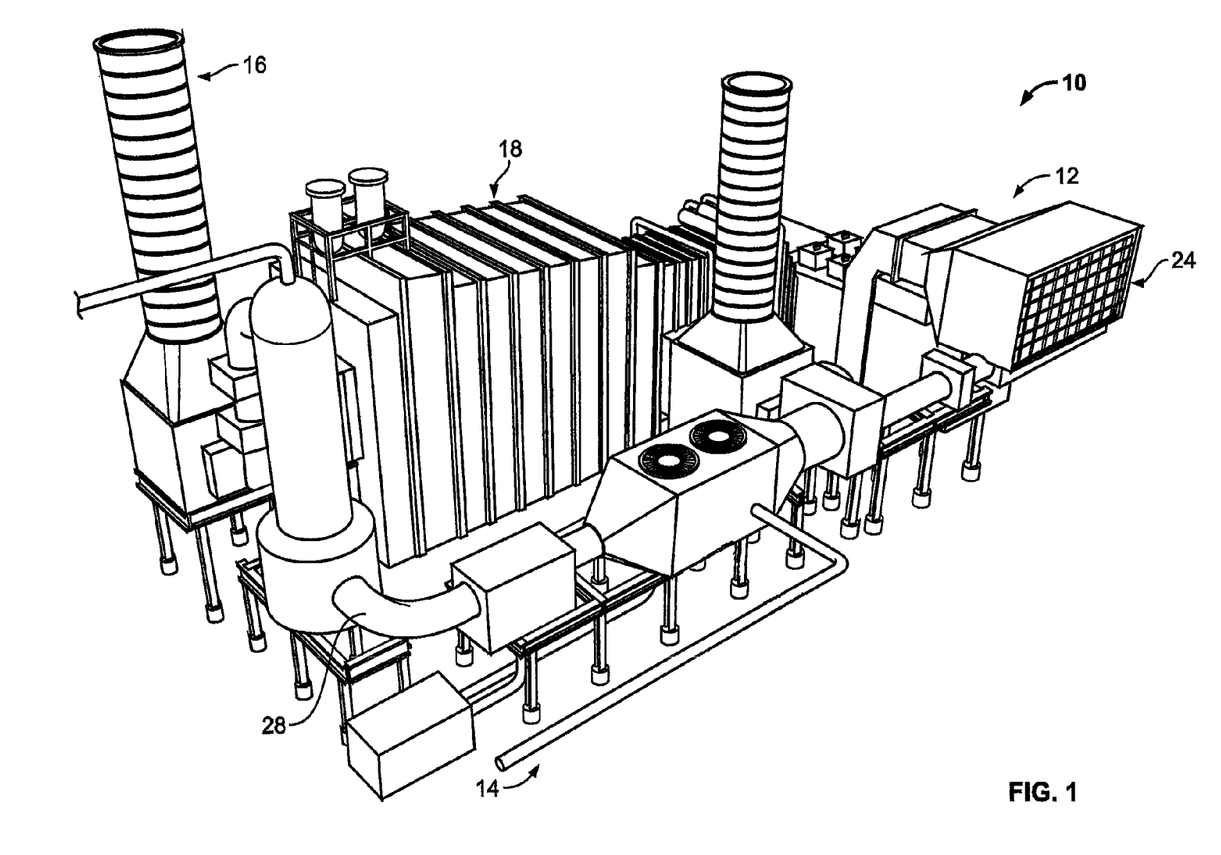
FIG. 1 shows a powerplant site including a turbomachine and an exhaust gas recirculation (EGR) system.

Turning to the figures in which like reference numerals indicate like elements, FIG. 1 shows an example of an environment in which an embodiment of the present invention may be implemented. FIG. 1 shows a site 10, such as a powerplant site, which may have a gas turbine 12, an EGR system 14, an exhaust stack 16, and a heat recovery steam generator (HRSG) 18. The EGR system 14 circulates an exhaust gas stream through an exhaust guide element 28, such as a duct, a pipe, a tube or any means for guiding or channeling a fluid, from an outlet to an inlet 24 of the gas turbine and includes a heat exchanger for cooling the exhaust gas stream as will be described below. It should be noted that variations of the present invention may add or remove certain features of the shown powerplant site. For example, the present invention may be implemented in a site that does not have the HRSG.

FIGS. 2-5 show various embodiments of the EGR system 14. There are multiple arrangements that may be used to accomplish exhaust gas treatment. Although not discussed in detail, other embodiments may include, in addition to what will be described below, a damper, a fan, a scrubber for removing particulates and/or other emissions from industrial exhaust streams, an injector that may introduce a reagent for reducing the level of harmful constituents within the exhaust stream, or a wet electrostatic precipitator for removing the aforementioned constituents including sulfite particles.

The EGR system comprises multiple elements. The configuration and sequence of these elements may be dictated by the composition of the exhaust stream and the type of cooling fluid used by the components of the EGR system. Furthermore, alternate embodiments of the EGR system may include additional or fewer components than the components described below. Therefore, various arrangements, and/or configurations, which differ from FIGS. 2-5, may be integrated with an embodiment of the present invention.

Figure 2:
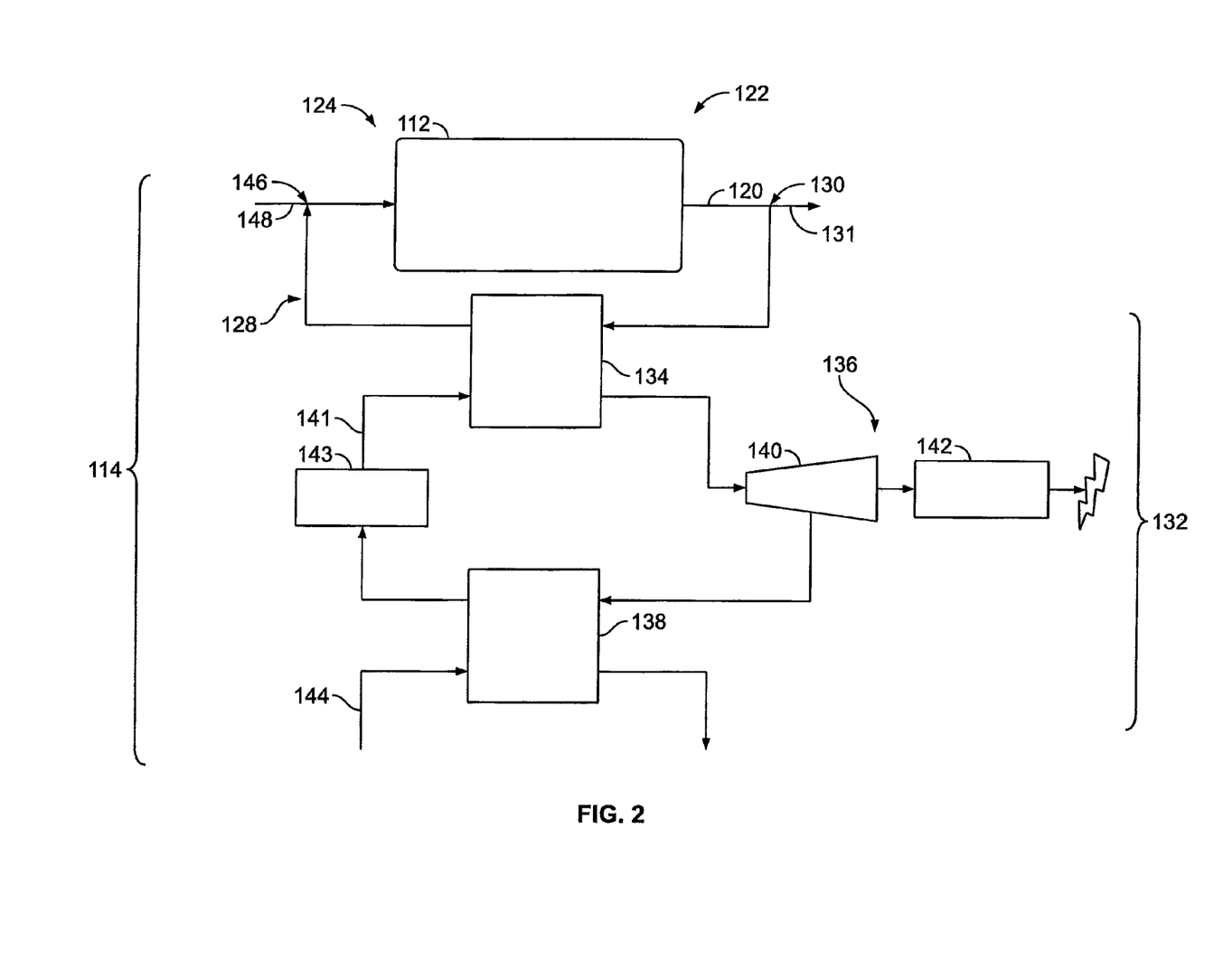
FIG. 2 shows a first embodiment of the EGR system implemented with an organic Rankine cycle (ORC) system.

Turning to FIG. 2, a schematic of a first embodiment of the invention is shown in which the EGR system 114 is used with the gas turbine 112. Although not illustrated, the gas turbine 112 comprises a compressor having a shaft. Air enters the inlet of the compressor, is compressed by the compressor and is then discharged to a combustion system, where a fuel such as, but not limited to, natural gas is burned to provide high-energy combustion gases which drive the turbine. In the turbine, the energy of the hot gases is converted into work, some of which is used to drive the compressor through the shaft, with the remainder being available for useful work to drive a load (not illustrated).

The EGR system 114 may also comprise a flow modulation device at 130 to discard a part 131 of the exhaust gas stream 120 to the atmosphere as shown in FIG. 2. The flow modulation device may apportion the total exhaust flow between a non-circulated exhaust stream that is discarded to the atmosphere and a circulated exhaust stream that is the balance of the exhaust gas stream 120. In one example, the flow modulation device may circulate 25 to 40 percent of the exhaust gas stream 120 and discard the rest. The flow modulation device may be of a size and fabricated of a material capable of withstanding the physical properties for operation. Of course, the specific numeric values presented herein should not be considered to be limitations upon the present invention.

The EGR system 114 also comprises an organic Rankine cycle (hereinafter "ORC") system 132. The term "organic Rankine cycle" is used to describe a type of Rankine cycle where a fluid, such as hydrocarbon, ammonia water or the like, is used in the loop as a working fluid instead of water. It must be noted that the use of other fluids, that have a boiling point lower than that of water and that can change from liquid to vapor in the operating temperature range of the EGR system 114, is also possible. Alternate working fluids may result in differences in various properties such as efficiency, operating temperatures, etc. The organic Rankine cycle enables energy to be derived from relatively low temperature heat sources.

In this embodiment, the ORC system 132 is configured downstream of the flow modulation device 130. The ORC system 132 comprises a high temperature heat exchanger 134, an expansion device 136, a low temperature heat exchanger 138 and a pump 143. The working fluid 141 is pressurized at the pump 143, is heated by an external source to vaporize at the high temperature heat exchanger 134, generates power at the expansion device 136, and condenses to become liquid at the low temperature heat exchanger 138. The exhaust gas stream 120 functions as the external heat source at the high temperature heat exchanger 134 that is placed in heat exchange relationship with the exhaust guide element which is represented by the loop of arrows connecting the gas turbine 112 and the high temperature heat exchanger 134 in FIG. 2. The expansion device 136, such as a turboexpander or an expansion turbine, includes a turbine 140 through which the vaporized working fluid is expanded to power a generator 142 that is operatively coupled to the turbine 140. Electricity generated by the expansion device 136 can be stored or used to directly power an electrical apparatus. At the low temperature heat exchanger 138, a cooling medium 144, such as tap water, sea water or forced air, may be used to expel heat away from the ORC loop.

After undergoing heat exchange at the high temperature heat exchanger 134, the exhaust gas stream 120 proceeds to a mixing station which is located at 146 downstream of the ORC system 132 and where the exhaust gas stream 120 is mixed with ambient air 148 to form an inlet fluid that enters the compressor of the gas turbine 112. The mixing station may utilize, for example, baffles, flow turners or the like, to mix the inlet air with the exhaust gas stream 120. The EGR system 114 may also be without the mixing station, and the inlet air and the exhaust gas stream 120 may mix within an area adjacent the compressor such as an inlet duct, a plenum, an inlet filter house or the like.

In one example of an operating the EGR system 114, the mass flow of the recirculated exhaust gas stream 120 may be 100 pounds per second (lb/s) at 350° F. comprising a dry air flow of 94.56 pounds per second and 0.575 pound of moisture per pound of dry air. The exhaust gas stream 120 may reach such a temperature after flowing through the HRSG and may initially have a temperature ranging from 180 to 800° F. The EGR system 114 may be adjusted with additional components to bring the temperature of the exhaust gas stream 120 down to a desired range. Thereafter, the exhaust gas stream 120 flows to the high temperature heat exchanger 134 and the temperature of the exhaust gas stream 120 may be lowered to 119° F. through heat exchange with the working fluid 141 in the ORC system. The heated working fluid 141 flows through the expansion device 136 extracting energy and, in one example, a set of parameters generated 480 kilowatts (kW) of power. The working fluid 141 condenses in the low temperature heat exchanger 138 turning into liquid and the cooling medium 144 absorbs the heat released by the working fluid 141. In one example, sea water ranging between 57-75° F. was provided as the cooling medium at 2,106 gallons per minute (gpm). The working fluid 141 is thereafter pressurized at the pump and repeats the cycle. Meanwhile, the exhaust gas stream 120 flows downstream to the mixing station to be mixed with ambient air 148 prior to re-entering the inlet 124 of the gas turbine 112. A target temperature to which the exhaust gas stream 120 should be cooled prior to mixing with ambient air at the inlet 124 may be 85° F. The ambient air 148 may further cool the exhaust gas stream 120 or additional heat exchanging means downstream of the high temperature heat exchanger 134 and upstream of the mixing station may be provided in the EGR system 114. Based on the above, the only additional work necessary to operate the ORC system 132 is in driving the pump 143 and the ORC system 132 allows additional energy to be created from the waste heat of the exhaust gas stream 120. A reduction of temperature at the outlet 122 of the gas turbine by 100° F. can generate 5 million watts (MW) of power and reduce the cooling load by approximately 12 million BTU/hr (MMBTU/hr) for a flow rate of 100 pound per second (lb/s). Of course, the specific numeric values presented herein should not be considered to be limitations upon the present invention.

Figure 3:
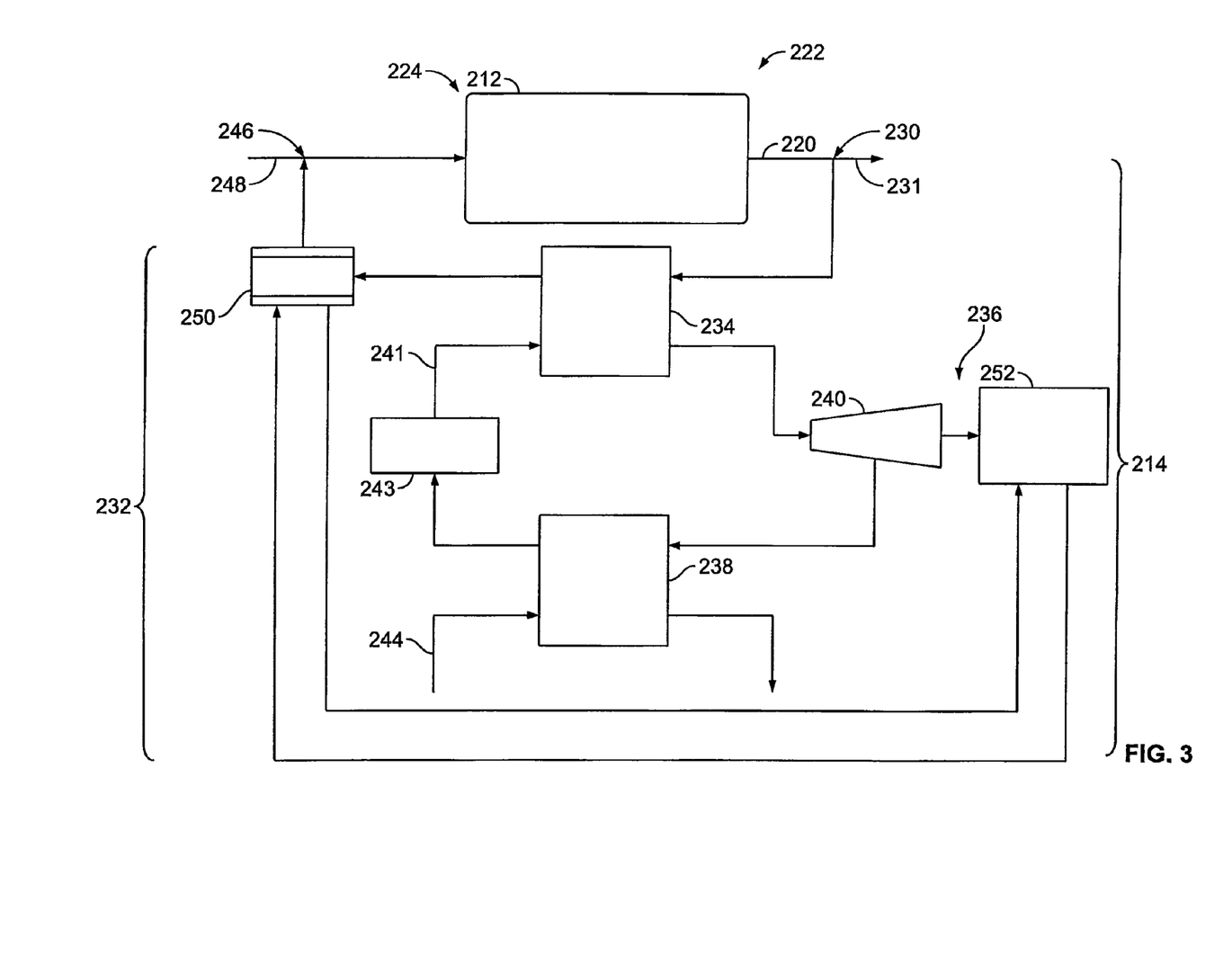
FIG. 3 shows a second embodiment of the EGR system with an ORC system.

FIG. 3 shows a schematic of a second embodiment of the invention with the EGR system 214. The second embodiment is similar to the first embodiment (i.e., gas turbine 212, EGR system 214, exhaust gas stream 220, gas turbine inlet 224, gas turbine outlet 222, flow modulation device 230, discarded exhaust gas 231, ORC system 232, high temperature heat exchanger 234, expansion device 236, low temperature heat exchanger 238, turbine 240, working fluid 241, pump 243, coolant 244, mixing station 246, ambient air 248). The exhaust gas stream 220 is cooled while moving through the EGR system 214 from the outlet 222 to inlet 224. Alternatively, in this embodiment, a demister/cooler 250 is located downstream of the high temperature heat exchanger 234 and upstream of the mixing station located at 246 with respect to the guide element and a turbine 240 of the expansion device 236 in the ORC system 232 is operatively coupled to a chiller 252 that circulates a coolant to the demister/cooler 250. The demister/cooler 250 functions as a secondary heat exchanger for cooling the exhaust gas stream 220 but is not part of the ORC system 232. The demister/cooler 250 may also remove droplets of water that may have carried from the heat exchanging process. In view of the function as a secondary heat exchanger, demister/cooler 250 can be referred to as a secondary heat exchanger 250 and as such is an example of an additional heat exchanger. The addition of the secondary heat exchanger 250 does not create a need for an external power source because the chiller 252 derives its power from the organic Rankine cycle to circulate the coolant. Thus, the secondary heat exchanger 250 provides further cooling of the exhaust gas stream 220 by using heat that otherwise would have been discarded or wasted. The ORC system 232 allows the overall efficiency of the system to be increased by eliminating the need for a separately powered cooling device and by powering the secondary heat exchanger 250 with the energy generated from ORC system 232.

When a secondary heat exchanger 250 is used, the operating temperatures at the high temperature heat exchanger 234 may be configured to occur above the acid dew point of the exhaust gas, which, in one example, may be approximately 175° F., whereas the secondary heat exchanger 250 may lower the temperature below the acid dew point of the exhaust gas. The cooling of the exhaust gas stream 220 may be divided in this fashion to accommodate for lack of corrosion resistance in certain components of the EGR system 214. Under this configuration, only the components downstream of the high temperature heat exchanger 234 in the EGR system 214 would need to be corrosion-resistant. However, heat recovery would not be optimized under this configuration because the temperature of the exhaust gas stream 220 would not be lowered to a minimum at the high temperature heat exchanger 234. It may be possible to maximize heat recovery by providing a high temperature heat exchanger that is corrosion resistant to achieve all of the cooling in a single heat exchanger.

Figure 4:
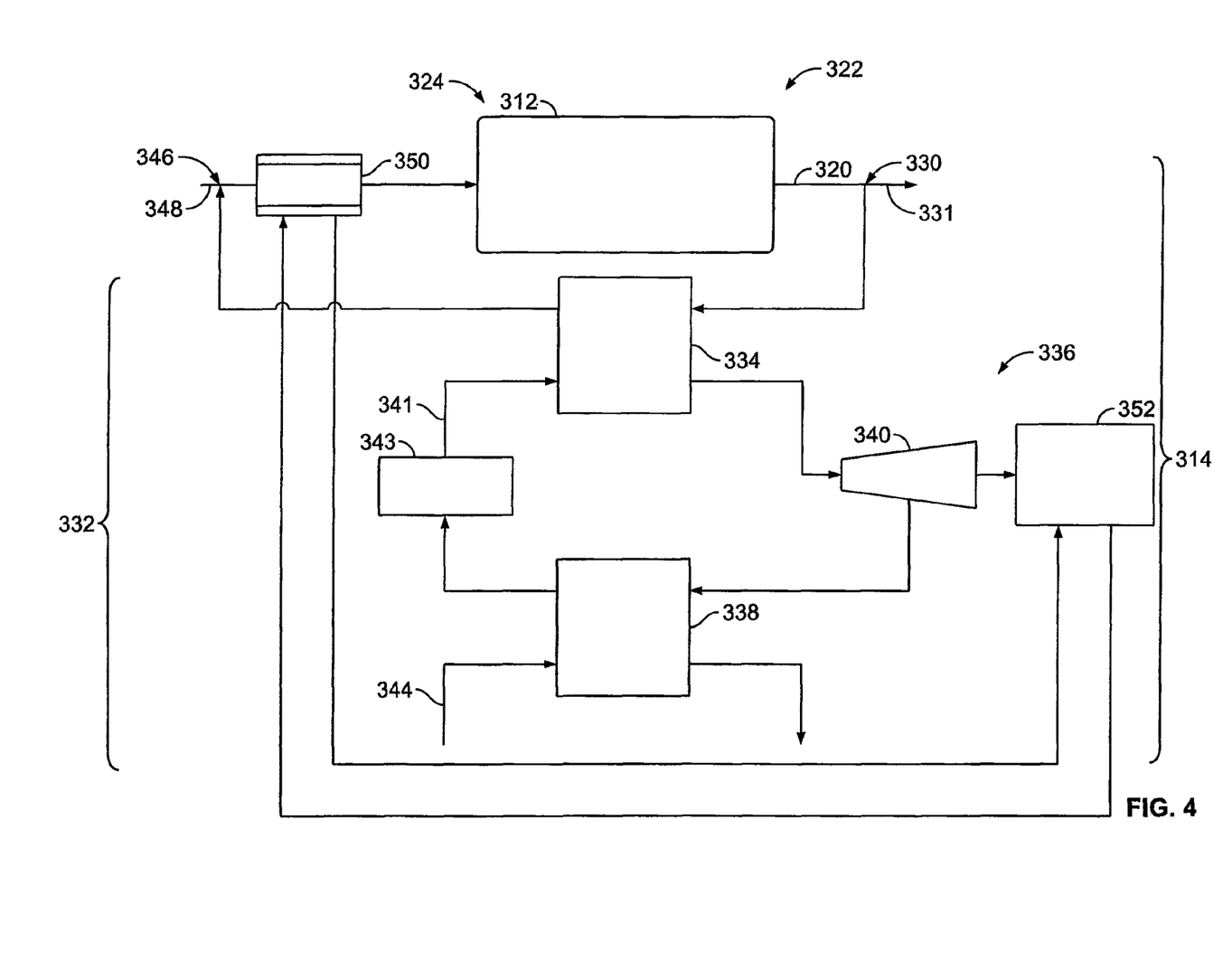
FIG. 4 shows a third embodiment of the EGR system with an ORC system.

FIG. 4 shows a schematic of a third embodiment of the invention with EGR system 314. The third embodiment is similar to the embodiments above (i.e., gas turbine 312, EGR system 314, exhaust gas stream 320, gas turbine inlet 324, gas turbine outlet 322, flow modulation device 330, discarded exhaust gas 331, ORC system 332, high temperature heat exchanger 334, expansion device 336, low temperature heat exchanger 338, turbine 340, working fluid 341, pump 343, coolant 344, mixing station 346, ambient air 348). The exhaust gas stream 320 is cooled while moving through the EGR system 314 from the outlet 322 to inlet 324. Alternatively, in this embodiment, a pre-cooler 350 is provided downstream of the mixing station located at 346 which is downstream of the high temperature heat exchanger 334. The pre-cooler 350 acts as the secondary heat exchanger 350 in the EGR system 314 heat treating the exhaust gas 320 after the exhaust gas stream 320 is mixed with ambient air 348 but before the exhaust gas stream 320 is returned to the inlet 324 of the gas turbine 312 for combustion. A turbine 340 of the expansion device 336 of the ORC system 332 is operatively coupled to a chiller 352 that circulates a coolant to the pre-cooler 350.

Figure 5:
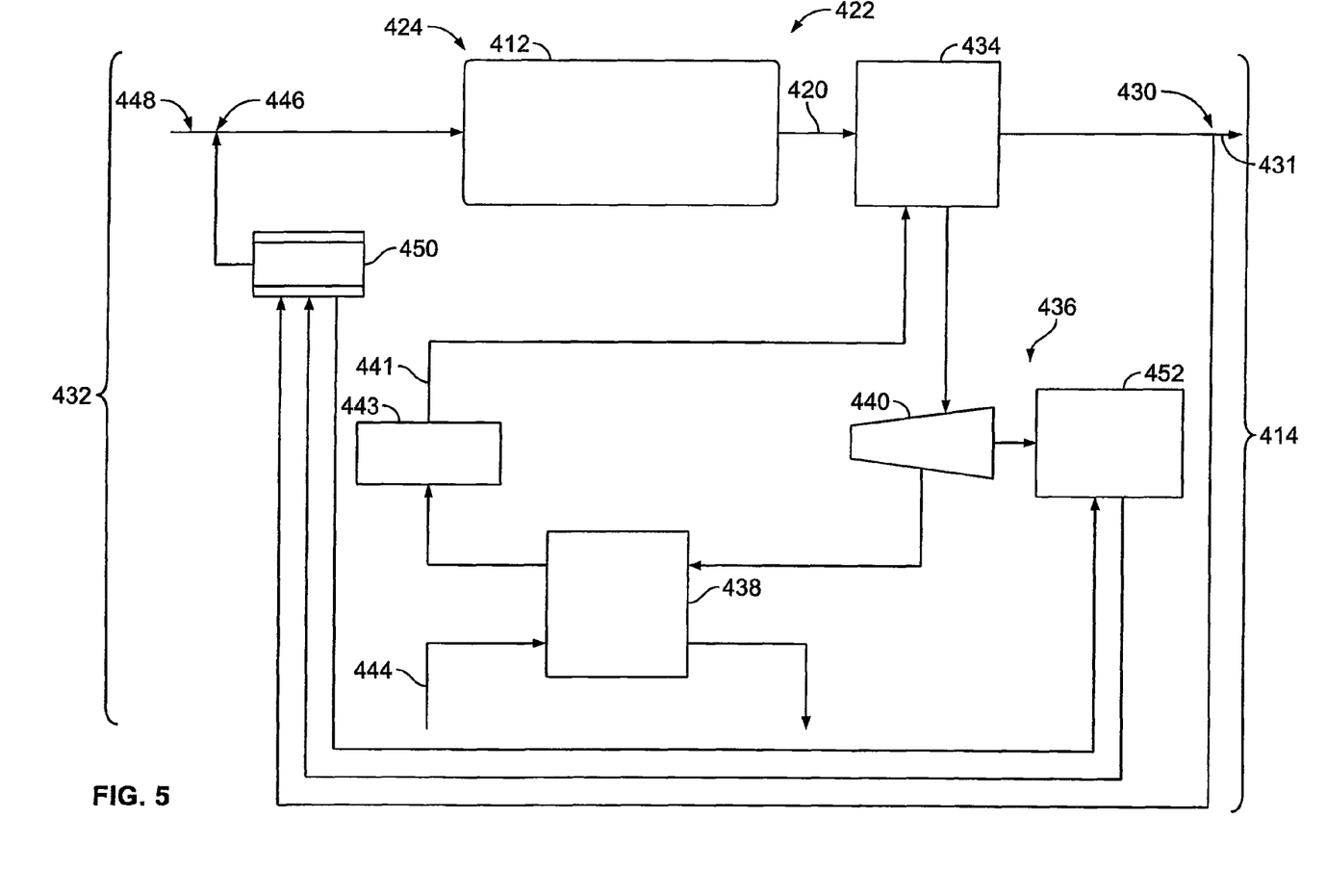
FIG. 5 shows a fourth embodiment of the EGR system with an ORC system.

FIG. 5 shows a schematic of a fourth embodiment of the invention with the EGR system 414. The fourth embodiment is similar to the above embodiments (i.e., gas turbine 412, EGR system 414, exhaust gas stream 420, gas turbine inlet 424, gas turbine outlet 422, flow modulation device 430, discarded exhaust gas 331, ORC system 432, high temperature heat exchanger 434, expansion device 436, low temperature heat exchanger 438, turbine 440, working fluid 441, pump 443, coolant 444, mixing station 446, ambient air 448). The exhaust gas stream 420 is cooled while moving through the EGR system 414 from the outlet 422 to inlet 424. Alternatively, in this embodiment, the high temperature heat exchanger 434 is provided upstream of the flow modulation device located at 430 such that 100% of the exhaust gas stream 420 is cooled or heat treated through the ORC system 432 before a portion of the exhaust gas stream 420 is discarded to the atmosphere. The remainder or balance of the exhaust gas stream 420 is channeled to the demister/cooler 450 or secondary heat exchanger 450 for further cooling. A coolant is circulated to the secondary heat exchanger 450 by the chiller 452 which is operatively coupled to the turbine 440 expansion device 436 of the ORC system 432 thereby removing the need for an external power source. It may be possible to provide a pre-cooler downstream of the mixing station located at 446 for cooling instead of the demister/cooler 450 prior to combustion, similarly to the third embodiment. When 100% of the exhaust gas stream 420 is treated through the ORC cycle, it is observed that significantly more energy is created from the ORC system and becomes available to the secondary heat exchanger 450 for use in cooling. The energy may also be available for pre-cooling of combustion air which, under certain atmospheric conditions, can increase the output and efficiency of the turbine.

It must be noted that the operating temperatures or the rates of flow of the medium are not the same for all embodiments and may be adjusted to adapt to the changes in an embodiment.

At the same time, there may be aspects of one embodiment that are equally applicable to other embodiments. For example, the EGR system may be divided into a corrosion-resistant portion and a non-corrosion-resistant portion or the entire of the EGR system may be corrosion-resistant.

The invention has been described with reference to the example embodiments described above. Modifications and alterations will occur to others upon a reading and understanding of this specification. Example embodiments incorporating one or more aspects of the invention are intended to include all such modifications and alterations insofar as they come within the scope of the appended claims.

What is claimed is:

1. A method of cooling an exhaust gas stream from an outlet of a turbomachine prior to recirculation to an inlet of the turbomachine, comprising the steps of:
   channeling the exhaust gas stream from the outlet of the turbomachine to the inlet of the turbomachine through a guide element;
   cooling the exhaust gas stream by providing a Rankine cycle system through which a working fluid is circulated,
      wherein the Rankine cycle system serially comprises:
         a high temperature heat exchanger in heat exchange relationship with the guide element;
         an expansion device;
         a low temperature heat exchanger in heat exchange relationship, with a cooling medium; and
         a pump; and
   cooling the exhaust gas stream by way of an additional heat exchanger and a chiller, wherein the chiller is operatively coupled to the expansion device and circulates a coolant to and from the additional heat exchanger, the additional heat exchanger being downstream of the high temperature heat exchanger,
      wherein the exhaust gas stream at the outlet has a first temperature and the exhaust stream downstream of the high temperature heat exchanger has a second temperature that is lower than the first temperature.

2. The method of claim 1, further comprising the step of generating electricity by operatively coupling the expansion device to a generator.

3. The method of claim 1, further comprising the step of mixing the exhaust gas stream with ambient air and cooling the exhaust gas stream mixed with ambient air by way of a secondary heat exchanger in fluid communication with a chiller operatively coupled to the expansion device, the secondary heat exchanger being downstream of the high temperature heat exchanger and upstream of the inlet of the turbomachine.

4. The method of claim 1, further comprising the step of discarding a portion of the exhaust gas stream into atmosphere and channeling a balance of the exhaust gas stream into the guide element by way of a flow modulation device upstream of the high temperature heat exchanger with respect to the guide element.

5. The method of claim 1, further comprising the steps of channeling all of the exhaust gas stream to the high temperature heat exchanger, and discarding a portion of the exhaust gas stream into atmosphere and channeling a balance of the exhaust gas stream into the guide element by way of a flow modulation device that is downstream of the high temperature heat exchanger and upstream of the secondary heat exchanger with respect to the guide element.

6. The method of claim 1, further comprising the step of using as the working fluid a fluid with a boiling point lower than a boiling point of water.

7. An exhaust gas recirculation (EGR) system for recirculating an exhaust gas stream from an outlet to an inlet of a turbomachine, the EGR system comprising:
   a guide element to channel the exhaust gas stream from the inlet to the outlet;
   a Rankine cycle system through which a working fluid is circulated,
      wherein the Rankine cycle system serially comprises:
         a high temperature heat exchanger in heat exchange relationship with the guide element;
         an expansion device;
         a low temperature heat exchanger in heat exchange relationship with a cooling medium; and
         a pump, and
      an additional heat exchanger fluidly connected to a chiller and the high temperature heat exchanger through which a portion of the exhaust gas stream is channeled,
         wherein the exhaust stream at the outlet has a first temperature and the exhaust stream downstream of the high temperature heat exchanger has a second temperature that is lower than the first temperature, and the expansion device is operatively coupled to the chiller which circulates a coolant to and from the additional heat exchanger, the additional heat exchanger being downstream of the high temperature heat exchanger and is in heat exchange relationship with the exhaust gas stream.

8. The EGR system of claim 7, wherein the expansion device is operatively coupled to a generator to generate electricity.

9. The EGR system of claim 7, further comprising a flow modulation device downstream of the high temperature heat exchanger with respect to the guide element configured to discard a portion of the exhaust gas stream into atmosphere and channel a balance of the exhaust gas stream into the guide element and to the secondary heat exchanger.

10. The EGR system of claim 7, wherein the expansion device is operatively coupled to a chiller in fluid communication with a secondary heat exchanger that is downstream of the high temperature heat exchanger and is in heat exchange relationship with the exhaust gas stream mixed with ambient air.

11. The EGR system of claim 7, further comprising a flow modulation device upstream of the high temperature heat exchanger with respect to the guide element configured to discard a portion of the exhaust gas stream into atmosphere and channel a balance of the exhaust gas stream into the guide element.

12. The EGR system of claim 7, wherein the working fluid has a boiling point lower than a boiling point of water.

* * * * *